(12) United States Patent
Takeuchi

(10) Patent No.: US 8,760,763 B2
(45) Date of Patent: Jun. 24, 2014

(54) HIGH REFRACTIVE INDEX MATERIAL

(75) Inventor: Yoshiyuki Takeuchi, Kawasaki (JP)

(73) Assignee: Tokyo Ohka Kogyo Co., Ltd., Kawasaki-shi (JP)

( * ) Notice: Subject to any disclaimer, the term of this patent is extended or adjusted under 35 U.S.C. 154(b) by 853 days.

(21) Appl. No.: 12/307,555

(22) PCT Filed: Jul. 4, 2007

(86) PCT No.: PCT/JP2007/063364
§ 371 (c)(1),
(2), (4) Date: Jan. 5, 2009

(87) PCT Pub. No.: WO2008/010415
PCT Pub. Date: Jan. 24, 2008

(65) Prior Publication Data
US 2009/0318725 A1 Dec. 24, 2009

(30) Foreign Application Priority Data
Jul. 21, 2006 (JP) .................. 2006-199237

(51) Int. Cl.
*G02B 27/10* (2006.01)
*G02B 6/00* (2006.01)

(52) U.S. Cl.
USPC .......................................... 359/620; 385/143

(58) Field of Classification Search
None
See application file for complete search history.

(56) References Cited

U.S. PATENT DOCUMENTS

| | | | |
|---|---|---|---|
| 5,046,634 A | 9/1991 | McFarlin et al. | |
| 5,991,493 A | 11/1999 | Dawes et al. | |
| 6,087,064 A | 7/2000 | Lin et al. | |
| 6,144,795 A * | 11/2000 | Dawes et al. | 385/141 |
| 6,731,857 B2 | 5/2004 | Shelnut et al. | |
| 2002/0172492 A1* | 11/2002 | Shelnut et al. | 385/143 |
| 2004/0048076 A1 | 3/2004 | Nakamura | |
| 2006/0023313 A1* | 2/2006 | Kim | 359/620 |
| 2009/0253886 A1* | 10/2009 | Nishikawa | 528/40 |

FOREIGN PATENT DOCUMENTS

| | | |
|---|---|---|
| CN | 1245563 | 2/2000 |
| CN | 1399439 | 2/2003 |
| EP | 0709434 A2 | 5/1996 |
| EP | 1251155 A1 | 10/2002 |

(Continued)

OTHER PUBLICATIONS

Derwent abstract of Arai et al. JP409329721.*

(Continued)

*Primary Examiner* — Rosalynd Keys
*Assistant Examiner* — Jennifer C Sawyer
(74) *Attorney, Agent, or Firm* — Knobbe, Martens, Olson & Bear, LLP

(57) ABSTRACT

Disclosed is a high refractive index material having a high refractive index, which enables the formation of a waveguide by a simpler method. Also disclosed are a high refractive index member made from the high refractive index material, and an image sensor. The high refractive index material contains a resin (A) having a structural unit represented by the following general formula (a-1)

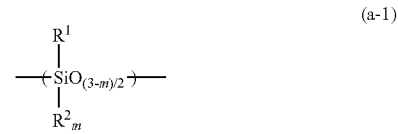

(a-1)

[In the formula, $R^1$ is a hydrocarbon group, $R^2$ is a hydrogen atom or a hydrocarbon group, and m is an integer of 0 or 1.].

4 Claims, 3 Drawing Sheets

(56) References Cited

FOREIGN PATENT DOCUMENTS

| | | | |
|---|---|---|---|
| JP | H05-66301 | | 3/1993 |
| JP | 8327842 | * | 12/1996 |
| JP | H08-327842 | | 12/1996 |
| JP | 409329721 | * | 12/1997 |
| JP | 2000-39529 | | 2/2000 |
| JP | 2000-235103 | | 8/2000 |
| JP | 2001-506372 | | 5/2001 |
| JP | 2003-48984 | | 2/2003 |
| JP | 2005-17940 | | 1/2005 |
| JP | 2005-266474 | | 9/2005 |
| JP | 2006-119472 | | 5/2006 |
| KR | 2002-77168 | | 10/2002 |
| TW | 593603 B | | 6/2004 |
| WO | WO 98/26315 | | 6/1998 |
| WO | WO 2006107029 | * | 12/2006 |

OTHER PUBLICATIONS

Notice of Reasons for Rejection issued to Korean Patent Application No. 10-2008-7031906, mailed Feb. 23, 2011.
The Extended European Search Report issued in EP Application No. 07768122.9, mailed Oct. 29, 2010.
Notice of Reasons for Rejection issued to Chinese Application No. 200780025360.5, mailed Mar. 24, 2011.
Office Action in corresponding Chinese Patent Application No. 200780025360.5, mailed Dec. 21, 2010.
Notice of Reasons for Rejection issued to Chinese Application No. 200780025360.5, mailed Jul. 6, 2011.
Notice of Reasons for Rejection in Taiwanese Application No. 96126433, mailed Nov. 2, 2011.
International Search Report corresponding to PCT Application No. PCT/JP2007/063364, 2007.

* cited by examiner

HIGH REFRACTIVE INDEX MATERIAL

RELATED APPLICATIONS

This application is the U.S. National Phase filing under 35 U.S.C. §371 of PCT/JP2007/063364, filed Jul. 4, 2007, which designated the United States and was published in a language other than English, which claims priority under 35 U.S.C. §119(a)-(d) to Japanese Patent Application Number 2006-199237, filed on Jul. 21, 2006. The content of these applications is incorporated herein by reference in their entireties.

TECHNICAL FIELD

The present invention relates to a high refractive index material, in particular a high refractive index material having a high ability to be filled into grooves and holes and capable of forming high refractive index members.

BACKGROUND ART

In recent years, siloxane resins have been employed for high refractive index materials used for optical elements such as photoelectric integrated circuits, optical integrated circuits, CCD (Charge Coupled Device) sensors, and CMOS (Complementary Metal Oxide Semiconductor) (see Patent Documents 1 to 3).

[Patent Document 1] Japanese Patent Application Laid-open No. 2000-39529 A

[Patent Document 2] Japanese Patent Application Laid-open No. H5-66301 A

[Patent Document 3] Japanese Patent Application Laid-open No. 2000-235103 A

DISCLOSURE OF THE INVENTION

Problems to be Solved by the Invention

However, photolithography is typically performed to form optical waveguides as described in Patent Document 1. The methods, employing such photolithography, have a problem that processing is complicated and production efficiency is lower due to the steps of forming, patterning, removing of resist films, etc.

Accordingly, it has been investigated that optical waveguides are formed by way of embedding a high refractive index material into pre-formed grooves, holes, etc. and processing their surface by etching, CMP, etc. That is, the high refractive index material is required to enable embedding into grooves, holes, etc. Patent Documents 1 to 3 described above do not consider this embedding property.

In view of the problems described above, it is an object of the present invention to provide a high refractive index material that enables the formation of a high refractive index member having a high refractive index and exhibits an appropriate embedding property, a high refractive index member made from the high refractive index material, and an image sensor.

Means for Solving the Problems

The present inventors have found that higher refractive indices can be induced and embedding property into fine spaces can be enhanced by use of a siloxane compound having a certain structural unit, thereby achieving the present invention.

The present invention is a high refractive index material to be filled into fine spaces and to form a high refractive index member, in which the high refractive index material contains a siloxane compound (A) that has a structural unit expressed by General Formula (a-1) shown below and includes at least two carbon atoms per silicon atom.

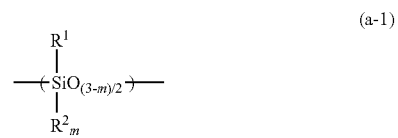

(a-1)

[in the formula, $R^1$ is a hydrocarbon group, $R^2$ is a hydrogen atom or a hydrocarbon group, and m is an integer of 0 or 1]

In addition, the present invention provides a high refractive index member formed from the high refractive index material described above and an image sensor with the high refractive index member.

Effects of the Invention

In accordance with the present invention, a high refractive index material can be provided that has a high refractive index and possesses a high embedding property. Consequently, high refractive index members such as light guide paths can be formed by filling the high refractive index material into fine spaces by simpler processes thereby production steps can be simplified.

In addition, image sensors can be provided such as CCD sensors and CMOS sensors with high sensitivity and high resolution by use of the high refractive index material of the present invention.

PREFERRED MODE FOR CARRYING OUT THE INVENTION

Figure 1A:
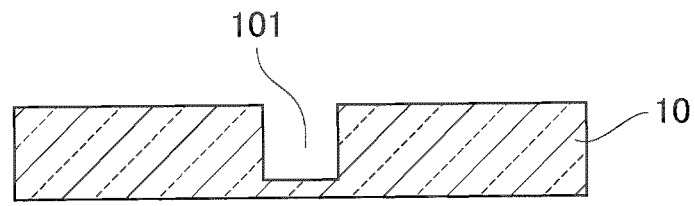
FIG. 1A-1D is a view to show production steps of the high refractive index member according to the present invention.

Hereinafter, embodiments of the present invention will be explained.

The high refractive index material according to the present invention contains a siloxane compound (A).

Here, the term "high refractive index" refers to a refractive index that is higher than 1.45, preferably at least 1.5, and more preferably at least 1.6. The upper limit of the refractive index, which is not particularly limited, is preferably no higher than 2.0, and more preferably no higher than 1.8.

Siloxane Compound (A)

The siloxane compound (A) has a structural unit expressed by General Formula (a-1) shown below and includes at least two carbon atoms per silicon atom.

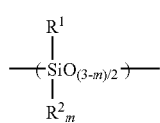

(a-1)

[in the formula, $R^1$ is a hydrocarbon group, $R^2$ is a hydrogen atom or a hydrocarbon group, and m is an integer of 0 or 1]

Here, the "hydrocarbon group" in $R^1$ and $R^2$ is exemplified by linear, branched or cyclic alkyl groups having 1 to 12 carbon atoms, and aromatic hydrocarbon groups. These hydrocarbon groups may have a substituent. The substituent is exemplified by a hydroxyl group and alkoxy groups having 1 to 5 carbon atoms.

As described above, the refractive index of the resulting member can be raised by use of a resin having a hydrocarbon group. The refractive index of the resulting member can be further raised by use of a resin having an aromatic hydrocarbon group in particular.

Furthermore, the high refractive index material can be enhanced with respect to the embedding property into fine spaces. Here, the term "fine space" in the present invention refers to grooves having a width of less than 2 μm, holes having a diameter of less than 2 μm, etc. When aspect ratio (depth:width or diameter) of the fine spaces is 8:1 to 4:2, the embedding property is particularly enhanced in regards to the high refractive index material of the present invention.

The hydrocarbon group described above is preferably alkyl groups having 1 to 5 carbon atoms, examples thereof include methyl group, ethyl group, n-propyl group, i-propyl group, n-butyl group, and tert-butyl group. Decrease of heat resistance can be prevented by use of the alkyl groups having 1 to 5 carbon atoms.

Examples of the aromatic hydrocarbon group include benzyl group, phenethyl group, phenyl group, naphthyl group, anthracenyl group, phenanthryl group, biphenyl group, fluorenyl group, and pyrenyl group. The number of benzene ring is preferably 1 to 3 in the aromatic hydrocarbon group. By setting the number of benzene ring to 1 to 3, productivity of the siloxane compound (A) can be enhanced, and the high refractive index member can be easily generated by way of raising the polymerization degree thereby to suppress volatilization at the time of calcination.

Furthermore, production cost can be reduced. It is also preferred that the aromatic hydrocarbon group contains a group having a hydroxyl group as a substituent. Thereby the high refractive index member can be provided with a smaller grain and a higher density, thus the higher refractive index and the embedding property can be effectively enhanced.

It is preferred that the aromatic hydrocarbon group is specifically those having structures shown below.

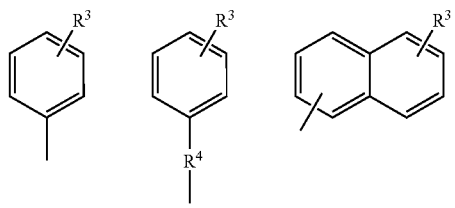

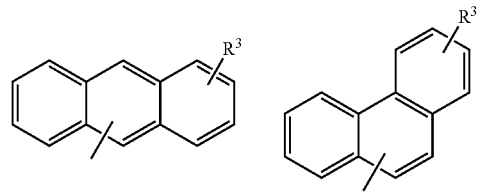

In the formulas described above, $R^3$ is a hydrogen atom; hydroxyl group; alkoxy groups such as methoxy group, ethoxy group, butoxy group, and propoxy group; or hydrocarbon groups such as methyl group, ethyl group, butyl group, and propyl group; $R^4$ is an oxygen atom; or alkylene groups such as methylene group, ethylene group, propylene group, and butylene group. It is enough that the aromatic hydrocarbon group has $R^3$ in at least one aromatic ring in the aromatic hydrocarbon group and a plurality thereof is allowable. When a plurality of $R^3$ exists, these $R^3$ may be identical or different.

When the embedding property is considered, particularly preferable $R^1$ is those having a structure of ($R^1$-a) or ($R^1$-b) shown below, in particular ($R^1$-b).

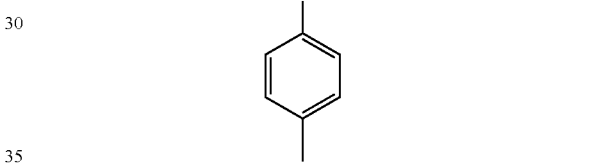

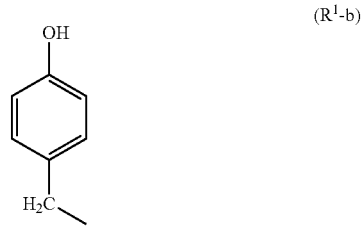

It is also preferred that m is 0 in Formula (a-1), and the siloxane compound (A) has a silsesquioxane skeleton in the case. Furthermore, it is more preferred that the siloxane compound described above is a ladder-type silsesquioxane.

Furthermore, it is preferred in the structural unit (unit skeleton) expressed by General Formula (a-1) that the atomic ratio of carbon atoms to silicon atoms is two or greater and or less. By setting such atomic ratio, the refractive index of the high refractive index material can be easily made to be at least 1.5.

The siloxane compound (A) may be a compound having two or more kinds of structural units (a-1). In addition, the siloxane compound (A) may be a mixture of siloxane compounds having different structural units (a-1).

The siloxane compound described above is specifically exemplified by the siloxane compounds expressed by the structural formulas (A-1-1) to (A-1-3).

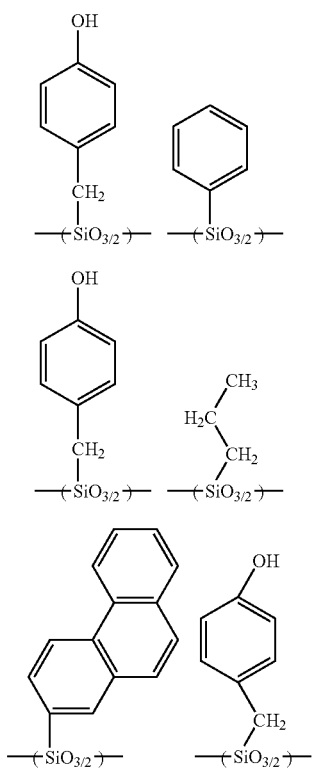

(A-1-1)

(A-1-2)

(A-1-3)

Mass-average molecular weight (Mw) of the siloxane compound (A), which is not specifically limited, is preferably 2,000 to 30,000, more preferably 2,500 to 20,000, and most preferably 3,000 to 15,000. By setting the molecular weight to this range, solubility in organic solvents can be improved. In addition, the high refractive index material can be enhanced with respect to the embedding property. Furthermore, the high refractive index member can be easily formed through suppressing volatilization at the time of calcination.

The siloxane compound (A) can be produced by hydrolyzing and polycondensing the respective monomers that constitute the respective structural units.

Organic Solvent

The high refractive index material according to the present invention may contain an organic solvent (B).

The organic solvent (B) is specifically exemplified by alcohols such as methanol, ethanol, propanol, and n-butanol; polyhydric alcohols such as ethylene glycol, diethylene glycol, propylene glycol, and dipropylene glycol; ketones such as acetone, methyl ethyl ketone, cyclohexanone, methyl-n-amyl ketone, methyl isoamyl ketone, and 2-heptanone; compounds having an ester linkage, such as ethylene glycol monoacetate, diethylene glycol monoacetate, propylene glycol monoacetate, and dipropylene glycol monoacetate; derivatives of polyhydric alcohols, such as compounds having an ether linkage including monoalkyl ethers (e.g., monomethyl ethers, monoethylethers, monopropyl ethers and monobutyl ethers) and monophenyl ethers of the polyhydric alcohols described above or the compounds having an ester linkage described above; cyclic ethers such as dioxane; esters such as methyl lactate, ethyl lactate, methyl acetate, ethyl acetate, butyl acetate, methyl pyruvate, ethyl pyruvate, methyl methoxypropionate, and ethyl ethoxypropionate; and aromatic organic solvents such as anisole, ethyl benzyl ether, cresyl methyl ether, diphenyl ether, dibenzyl ether, phenetol, butyl phenyl ether, ethylbenzene, diethylbenzene, amylbenzene, isopropylbenzene, toluene, xylene, cymene, and mesitylene.

These organic solvents may be used alone or in combination of two or more.

Among others, propylene glycol monomethyl ether acetate (PGMEA), propylene glycol monomethyl ether (PGME), and n-butanol are preferably used.

The amount used of the organic solvent, which is not particularly limited, is preferably such that solid content concentration of the high refractive index material is 2% by mass to 50% by mass, more preferably 5% by mass to 40% by mass.

Surfactant

The high refractive index material according to the present invention may contain a surfactant (C). The high refractive index material according to the present invention can be enhanced with respect to the embedding property by containing the surfactant (C).

The surfactant (C) can be publicly known ingredients without particular limitation.

The high refractive index material of the present invention can be appropriately embedded into fine spaces.

Method of Producing High Refractive Index Member

The high refractive index member according to the present invention is exemplified by light guide paths applied to optical fiber, optical interconnection substrates, etc., parts, optical lenses, etc. of various devices such as image sensors, cameras, copiers, etc.

Here, a case to form a light guide path is explained with reference to FIG. 1A-1D.

Figure 1B:
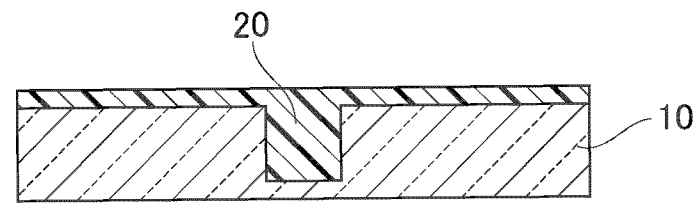
Figure 1C:
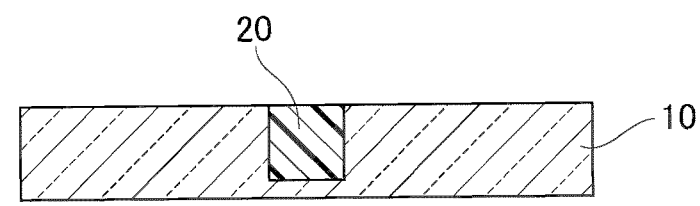
Figure 1D:
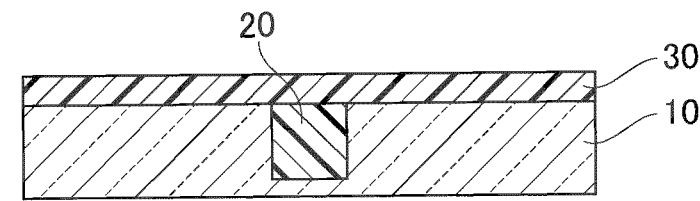
Figure 2:
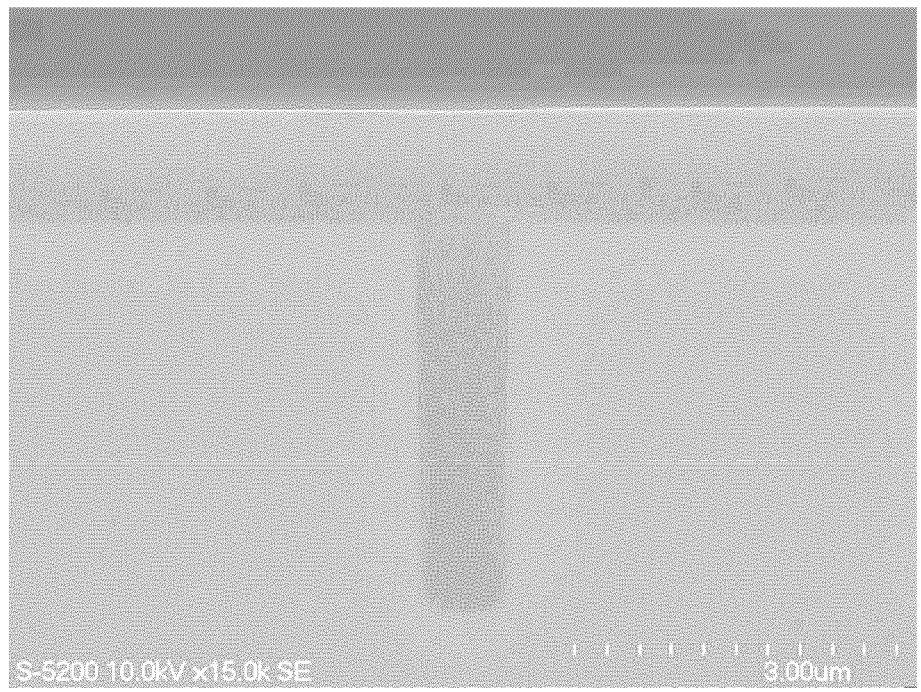
FIG. 2 is a SEM image of an embedded member formed from the resin composition of Example 1.
Figure 3:
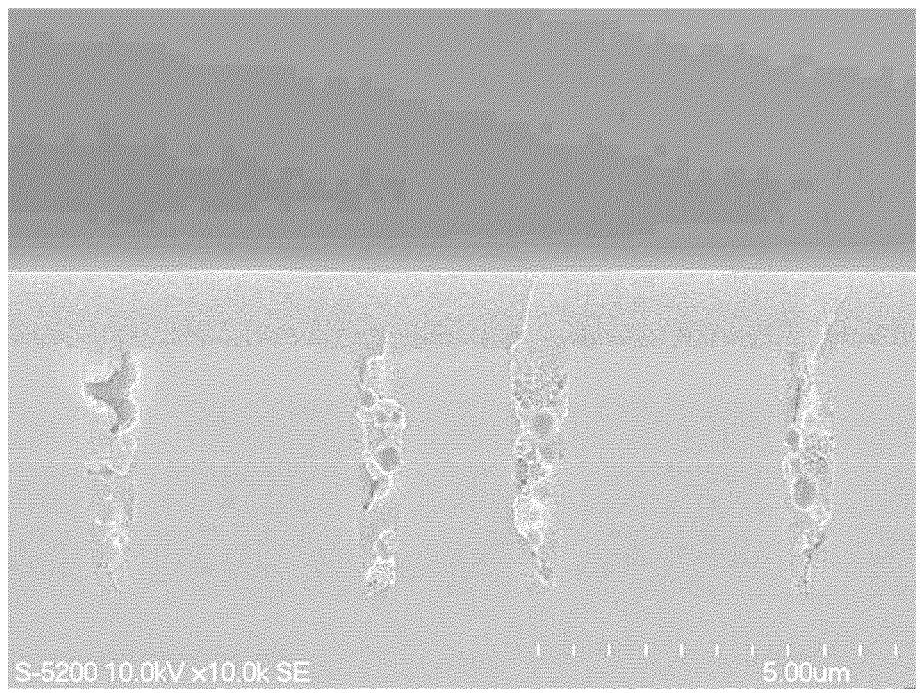
FIG. 3 is a SEM image of an embedded member formed from the resin composition of Comparative Example 1.

Initially, as shown in FIG. 1A, 1B, the high refractive index material according to the present invention is coated on a substrate 10, to which a groove 101 (fine space) has been formed, to form a film 20 of the high refractive index material. The resulting film 20 of the high refractive index material is calcinated at a given temperature. Subsequently, as shown in FIG. 1C, the film 20 of the high refractive index material formed in areas other than the groove 101 is removed by CMP, etching, etc. Thereby a light guide path (core portion) is formed. Subsequently, a light confining portion 30 is formed on an upside portion as an optional step as shown in FIG. 1D. The light confining portion 30 can be easily formed by coating a material having a refractive index lower than that of the core portion formed from the high refractive index material described above (e.g., resin composition described in Comparative Example 1 described later) and calcinating thereof.

EXAMPLES

Example 1

A resin composition was prepared using a resin (mass-average molecular weight: 6,000) having a structural unit (a-1-1) shown below and adjusting the resin concentration to 20% by mass by PGMEA.

(a-1-1)

The resin composition described above was evaluated with respect to refractive index and embedding property.

Refractive Index

The resin composition was coated on a glass substrate by a spin coating process, and was baked at 80° C., 150° C., 200° C. for 1 minute respectively using a hot plate. Then a member having a film thickness of 1 μm was obtained by calcinating at 400° C. for 30 minutes under a nitrogen atmosphere.

The refractive index of the member was measured at 633 nm using a spectroscopic ellipsometer (produced by Woollam Co.). Results are shown in TABLE 1.

Embedding Property

The resin composition described above was coated on a substrate, on which a hole of 1 μm diameter and 4 μm deep had been formed, and baked at 80° C., 150° C., 200° C. for 1 minute respectively using a hot plate, then was calcinated at 400° C. for 30 minutes under a nitrogen atmosphere to obtain an embedded member. Then the cross section of the embedded member was captured using a scanning electron microscope (SEM) to evaluate the embedding property. In regards to the resulting embedded members, those having generated voids, peeling from the substrate, etc. were indicated as "x" and those that did not have these characteristics were indicated as "○".

Example 2

A resin composition was prepared using a resin (mass-average molecular weight: 2,500) having a structural unit (a-1-2) shown below and adjusting the resin concentration to 30% by mass by PGMEA.

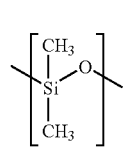
(a-1-2)

The resin composition was evaluated with respect to refractive index and embedding property similarly as Example 1. Results are shown in TABLE 1.

Example 3

A resin composition was prepared using a resin (mass-average molecular weight: 8,500, p:q=7:3 (mole ratio)) having a structural unit (a-1-3) shown below and adjusting the resin concentration to 20% by mass by n-butanol.

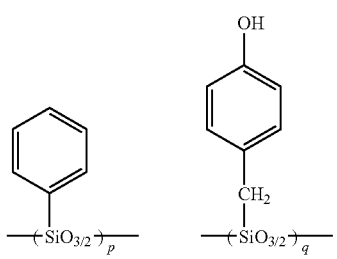
(a-1-3)

The resin composition was evaluated with respect to refractive index and embedding property similarly as Example 1. Results are shown in TABLE 1.

Example 4

A resin composition was prepared using a resin (mass-average molecular weight: 2,800, p:q=7:3 (mole ratio)) having a structural unit (a-1-4) shown below and adjusting the resin concentration to 20% by mass by n-butanol.

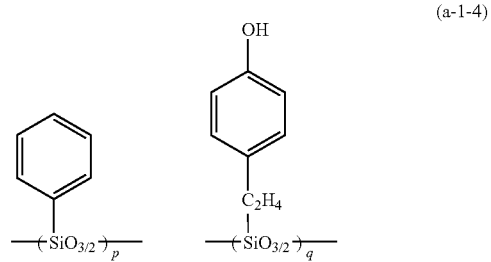
(a-1-4)

The resin composition was evaluated with respect to refractive index and embedding property similarly as Example 1. Results are shown in TABLE 1.

Example 5

A resin composition was prepared using a resin (mass-average molecular weight: 3,000, p:q=7:3 (mole ratio)) having a structural unit (a-1-5) shown below and adjusting the resin concentration to 25% by mass by n-butanol.

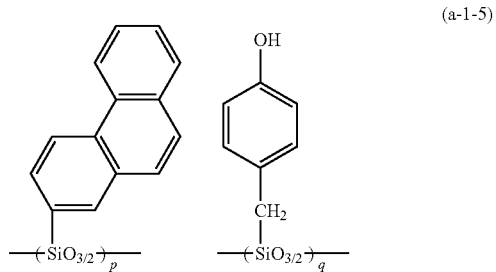
(a-1-5)

The resin composition was evaluated with respect to refractive index and embedding property similarly as Example 1. Results are shown in TABLE 1.

Comparative Example 1

A resin composition was prepared using a resin (mass-average molecular weight: 1,500) having a structural unit (a-1-6) shown below and adjusting the resin concentration to 30% by mass by PGMEA.

(a-1-6)

The resin composition was evaluated with respect to refractive index and embedding property similarly as Example 1. Results are shown in TABLE 1.

TABLE 1

| | Example 1 | Example 2 | Example 3 | Example 4 | Example 5 | Comparative Example 1 |
|---|---|---|---|---|---|---|
| Refractive Index | 1.54 | 1.53 | 1.54 | 1.54 | 1.63 | 1.40 |
| Embedding Property | ○ | ○ | ○ | ○ | ○ | X |

The invention claimed is:

1. A high refractive index member obtained by filling a fine space with a high refractive index material to form a high refractive index member, wherein the high refractive index material comprises a 2-phenanthrenylsilsesquioxane/p-hydroxybenzyl silsesquioxane copolymer.

2. An image sensor comprising the high refractive index member according to claim 1.

3. The high refractive index member according to claim 1, wherein the mass average molecular weight of the siloxane compound (A) is 2,000 to 30,000.

4. The high refractive index member according to claim 1, wherein the high refractive index material comprises an organic solvent selected from the group consisting of propylene glycol monomethyl ether acetate, propylene glycol monomethyl ether and n-butanol.

* * * * *